US012655817B2

(12) United States Patent
Schroeder et al.

(10) Patent No.: US 12,655,817 B2
(45) Date of Patent: Jun. 16, 2026

(54) MARINE METHANOL INERT GAS BLANKETING

(71) Applicant: Caterpillar Inc., Peoria, IL (US)

(72) Inventors: Eric Lee Schroeder, Germantown Hills, IL (US); Richard Christopher Kulaga, Naperville, IL (US); David T. Montgomery, Edelstein, IL (US)

(73) Assignee: Caterpillar Inc., Peoria, IL (US)

( * ) Notice: Subject to any disclaimer, the term of this patent is extended or adjusted under 35 U.S.C. 154(b) by 970 days.

(21) Appl. No.: 17/809,483

(22) Filed: Jun. 28, 2022

(65) Prior Publication Data

US 2023/0417206 A1     Dec. 28, 2023

(51) Int. Cl.
| | |
|---|---|
| *F02M 27/02* | (2006.01) |
| *B01D 53/22* | (2006.01) |
| *B01D 53/26* | (2006.01) |
| *B63B 25/12* | (2006.01) |
| *B63H 21/38* | (2006.01) |
| *C01B 3/323* | (2026.01) |
| *C01B 3/501* | (2026.01) |

(Continued)

(52) U.S. Cl.
CPC .......... *F02M 27/02* (2013.01); *B01D 53/229* (2013.01); *B01D 53/265* (2013.01); *B63B 25/12* (2013.01); *B63H 21/38* (2013.01); *C01B 3/323* (2013.01); *C01B 3/501* (2013.01); *C01B 32/50* (2017.08); *F02B 51/02* (2013.01); *F02B 63/042* (2013.01); *F02M 25/00* (2013.01); *F02M 31/20* (2013.01); *C01B 2203/0233* (2013.01); *C01B 2203/0405* (2013.01); *C01B 2203/0475* (2013.01); *C01B 2203/0495* (2013.01); *C01B 2203/1223* (2013.01); *C01B 2210/0009* (2013.01); *C01B 2210/0062* (2013.01)

(58) Field of Classification Search
CPC ........ F02M 27/02; F02M 31/20; F02M 25/00; F02B 63/042; F02B 51/02; B01D 53/229; B01D 53/265

See application file for complete search history.

(56) References Cited

U.S. PATENT DOCUMENTS

| | | | |
|---|---|---|---|
| 7,275,569 B2 | 10/2007 | Hobbs | |
| 2003/0121481 A1* | 7/2003 | Dodd | C01B 3/52 123/3 |
| 2008/0187785 A1 | 8/2008 | Kwok | |

FOREIGN PATENT DOCUMENTS

| | | |
|---|---|---|
| CN | 205365273 U | 7/2016 |
| CN | 1028741984 A | 5/2017 |

(Continued)

OTHER PUBLICATIONS

Zelenka Jan et al: "The HyMethShip Project: Innovative Emission Free Propulsion for Ships", CIMAC Congress 2019, Vancouver, 104, 2019, pp. 1-15, XP093088732, Retrieved from the Internet: URL:https://www.hymethship.com/wp-content/uploads/2021/02/Zelenka-et-al_HyMethShip-CIMAC2019_paper_104.pdf.

(Continued)

*Primary Examiner* — Kevin A Lathers

(57) ABSTRACT

An inert blanket system includes a reformer that produces hydrogen gas and carbon dioxide. The hydrogen gas is separated from the carbon dioxide. The carbon dioxide is ported to a vapor region of a tank to reduce the flammability of the gases in the vapor region of the tank. Excess carbon dioxide is ported to an overflow system designed to store the excess carbon dioxide for future use or to sequester the carbon dioxide.

20 Claims, 4 Drawing Sheets

(51) Int. Cl.
*C01B 32/50* (2017.01)
*F02B 51/02* (2006.01)
*F02B 63/04* (2006.01)
*F02M 25/00* (2006.01)
*F02M 31/20* (2006.01)

(56) References Cited

FOREIGN PATENT DOCUMENTS

| | | | |
|---|---|---|---|
| CN | 108163215 | A | 6/2018 |
| DE | 102012002311 | A1 | 8/2013 |
| KR | 101369876 | B1 | 3/2014 |
| WO | WO2018/007326 | A1 | 1/2018 |

OTHER PUBLICATIONS

Written Opinion and International Search Report for Int'l. Patent Appln. No. PCT/US2023/022814, mailed Oct. 16, 2023 (16 pgs).

\* cited by examiner

146

MARINE METHANOL INERT GAS BLANKETING

TECHNICAL FIELD

The present disclosure relates generally to ship-based fuel tanks, and more specifically, to blanketing fuel tanks using a gaseous, inert product of a reformer.

BACKGROUND

Methanol fuel systems can be used for powering engines onboard ships. However, the storage of methanol, or other volatile fuel, in tanks onboard ships can present a safety hazard if the vapor space above the liquid line (or surface) of the liquid methanol is not covered (or blanketed) by an inert gas, allowing flammable methanol vapor to collect in the vapor space. In such applications it is desirable to render the vapor space of the fuel tank and other portions of the fuel system less prone to fire or explosion, i.e., reduce the flammability, by using a blanket of an inert gas. Introduction of a gas such as nitrogen and/or carbon dioxide to the fuel tank or a jacket around fuel lines can provide an element of protection against fire or explosion. However, the storage of large amounts of such an inert gas can lead to additional expense and take up significant space on a marine vessel.

An example of a system that utilizes a reformer to generate carbon dioxide and hydrogen is described in Chinese Patent No. 106741984B (hereinafter referred to as "the '984 patent"). The '984 patent discloses a system for catalytically reforming and deactivating an aircraft fuel tank and a working method of the system. The system is characterized in that a mixture of fuel steam in an upper-portion gas phase space of the fuel tank and air is dried and then compressed by a compressor and condensed. The liquid fuel is separated. Remaining mixed gas enters a catalytic reforming reactor for reaction under action of a catalyst to generate carbon dioxide, hydrogen, nitrogen, and water vapor. The hydrogen is separated from the other gases. The other gases are cooled and depressurized through a regenerator and a throttling valve and then enter the gas phase space of the fuel tank for deactivating. The hydrogen can be used for various systems, such as hydrogen fuel cells and the like. The system described in the '984 patent realizes controllable and automatic running through an oxygen concentration sensor and a control switch.

However, the system described in the '984 patent is configured to draw outside air into the tank headspace, and to draw headspace gasses into its system, such that the system consumes the oxygen via a chemical reaction. Such a system is characterized by varying feed composition based upon, for example timing of refueling and fuel consumption and temperature changes of the tank. Further, because outside air is drawn into the headspace, water vapor is also drawn into the tank which is problematic for a marine methanol fuel storage system due to the uptake of water by the methanol and be contrary to the International Code of Safety for Ships ("IGF Code") which requires an inert gas to blanket the methanol in the tank and to prevent the methanol from absorbing water vapor. In addition, the system described in the '984 patent is not configured to provide inert gases for fuel lines.

Examples of the present disclosure are directed to overcoming deficiencies of such systems.

SUMMARY

In one aspect of the present disclosure, a method includes reacting methanol with water vapor, with a reformer, to produce a mixture of hydrogen and carbon dioxide, directing the mixture from the reformer to a hydrogen selective membrane, separating, with the hydrogen selective membrane, hydrogen included in the mixture from carbon dioxide included in the mixture to produce a carbon dioxide/water mixture, cooling the carbon dioxide/water mixture in a condenser/cooler to condense the water and cool the carbon dioxide, thereby separating the water from the carbon dioxide/water mixture to form a carbon dioxide concentrated gas mixture, and directing the carbon dioxide concentrated gas mixture from the hydrogen selective membrane to a vapor region of a tank, the vapor region comprising an area within the tank above a liquid surface of methanol disposed within the tank, the carbon dioxide concentrated gas mixture forming an inert blanket in the vapor region.

In another aspect of the present disclosure, a system includes an internal combustion engine mechanically connected to a generator through a shaft, wherein the engine rotates the shaft to rotate windings of the generator to generate an electrical power output, a methanol tank for providing methanol to the engine and a reformer, wherein the reformer produces hydrogen gas and carbon dioxide from a reaction of the methanol and water vapor, a hydrogen selective membrane to separate the hydrogen gas from the carbon dioxide to produce a carbon dioxide/water mixture, a condenser/cooler to cool the carbon dioxide/water mixture to condense the water and cool the carbon dioxide, thereby separating the water from the carbon dioxide/water mixture to form a carbon dioxide concentrated gas mixture, and a blanket controller configured to manipulate a control valve to direct the carbon dioxide concentrated gas mixture produced by the reformer into a vapor region of a tank to produce an inert blanket in the vapor region of the tank to reduce a flammability of gases in the vapor region.

In a still further aspect of the present disclosure, a marine vessel includes an internal combustion engine mechanically connected to a generator through a shaft, wherein the engine rotates the shaft to rotate windings of the generator to generate an electrical power output, a methanol tank for providing methanol to the engine and a reformer, wherein the reformer produces hydrogen gas and carbon dioxide concentrated gas mixture from a reaction of the methanol and water vapor, a hydrogen selective membrane to separate the hydrogen gas from the carbon dioxide concentrated gas mixture, and a blanket controller configured to manipulate a control valve to direct the carbon dioxide concentrated gas mixture produced by the reformer into a vapor region of a tank to produce an inert blanket in the vapor region of the tank to reduce a flammability of gases in the vapor region, or, an overflow system for receiving an excess of the carbon dioxide.

DETAILED DESCRIPTION

Figure 1:
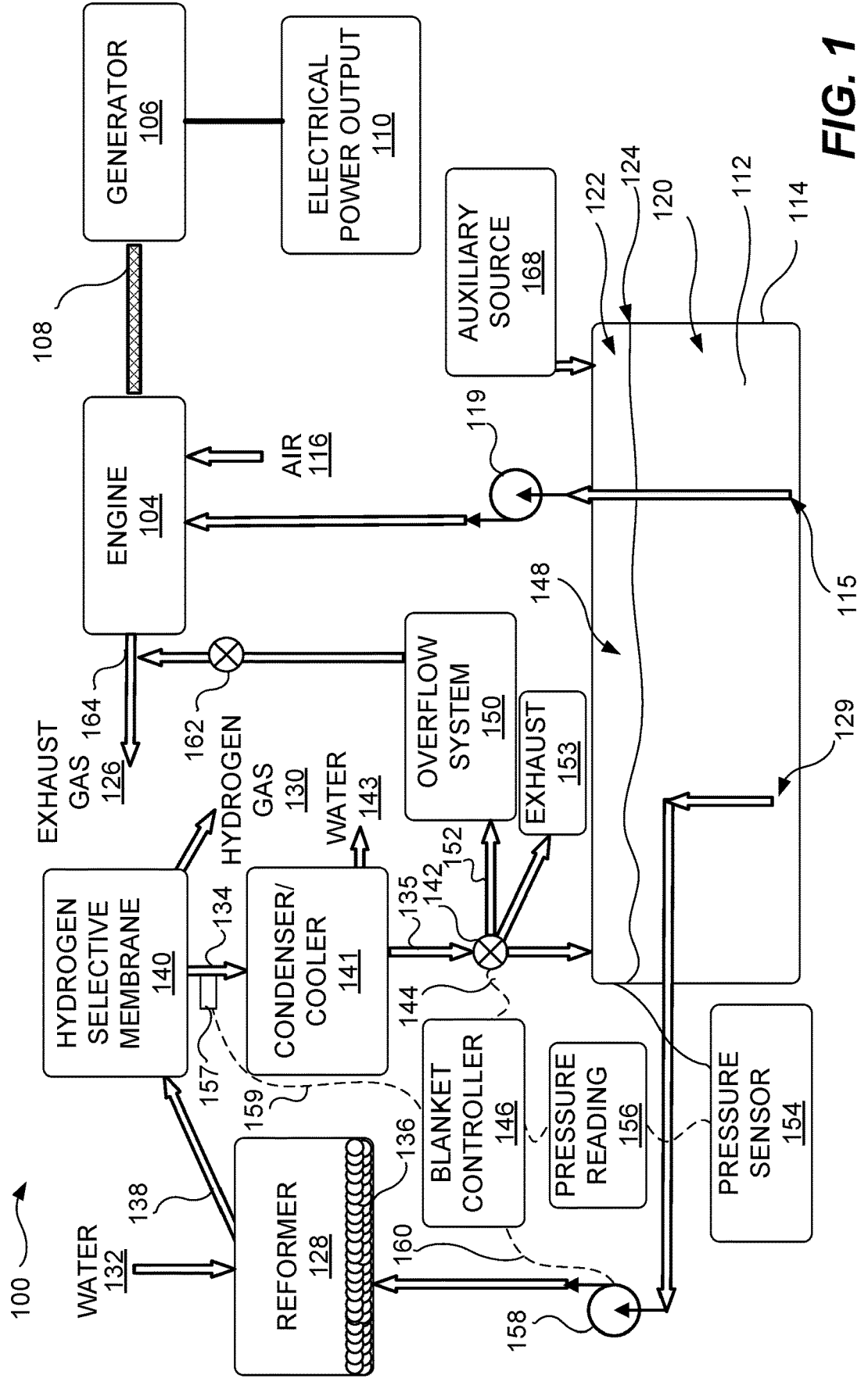
FIG. 1 is a schematic illustration of a shipboard engine system that uses carbon dioxide produced by a reformer to provide an inert gaseous blanket in a vapor space of a methanol fuel tank, in accordance with one or more examples of the present disclosure.

Wherever possible, the same reference numbers will be used throughout the drawings to refer to same or like parts. FIG. 1 is a schematic illustration of system 100 used in a ship or marine vessel (not shown) that uses product gases of a reformer to provide an inert gas blanket, in accordance with one or more examples of the present disclosure. The system 100 includes an engine 104 and a generator 106. The engine 104 is mechanically attached to the generator 106 by shaft 108. When the engine 104 is in operation, the engine 104 rotates the shaft 108. The shaft 108 rotates windings within the generator 106, thereby producing an electrical power output 110. The engine 104 and the generator 106 can be a single unit or can be separate units, the presently disclosed subject matter not being limited to any particular engine/generator configuration. Further, the generator 106 may produce alternating current or direct current electrical power, the presently disclosed subject matter not being limited to any particular type of electrical power output 110 generated. It should further be noted that the presently disclosed subject matter is not limited to uses whereby the engine 104 is used to produce electrical power via a generator 106. The presently disclosed subject matter includes uses of the engine 104 whereby the engine 104 provides other forms of power, such as motive force through a drivetrain to move a vehicle, rotate a propellor, and the like.

The engine 104 is a hydrocarbon fuel-based reciprocating piston internal combustion engine, although other engine types such as continuous combustion or turbine engines may be used. Further, the engine 104 could be a pure methanol engine (spark ignited) or a dual fuel engine, such as running on both methanol and one of diesel, renewable diesel, biodiesel. The engine 104 could also be any other engine that runs on a combination of fuels that include methanol. In the example illustrated in FIG. 1, fuel for the engine comprises methanol 112 received through methanol input 115. The methanol 112 is stored in a methanol tank 114. Air 116 and the methanol 112 are fed using fuel pump 119 for the methanol 112 to the engine 104 for combustion. The methanol 112 is stored primarily as a liquid in a liquid region 120 of the methanol tank 114, however some methanol 112 may evaporate into a vapor region 122 of the methanol tank 114. A liquid surface 124, which is the top surface of the methanol 112 in liquid form, generally delineates a boundary between the vapor region 122 and the liquid region 120 of the methanol tank 114. As noted above, the system 100 of FIG. 1 is described in terms of the use of methanol 112 as a fuel, however, other types of fuels may be used and are considered to be within the scope of the presently disclosed subject matter. Exhaust gas 126 is produced from the combustion of the methanol 112 and the air 116 in the engine 104.

The system 100 further includes a reformer 128 used to produce hydrogen gas 130. The reformer 128 can be various types of reformers such as steam reformers and partial oxidation reformers. The presently disclosed subject matter is not limited to any particular type of reformer. The reformer 128 of FIG. 1 is a methanol 112 reformer that produces the hydrogen gas 130 according to the following reaction:

$$CH_3OH + H_2O \rightarrow CO_2 + 3H_2 \qquad \text{(Reaction 1)},$$

where $CH_3OH$ is methanol 112 received through reformer input 129, $H_2O$ is water 132 (typically in vapor form), $CO_2$ is carbon dioxide and $H_2$ is the hydrogen gas 130. The reformer 128 illustrated in FIG. 1 uses a catalyst 136 to support the Reaction 1 in the reformer 128. The catalyst 136 can be various types of catalysts including, but not limited to, nickel, $Cu/ZnO/Al_2O_3$, and other types of catalysts. The reformer 128 product gas 138 can include carbon dioxide, hydrogen, as well as water vapor, nitrogen, and other fluids depending on the inputs to the reformer 128. The product gas 138 is fed to a hydrogen selective membrane 140. The hydrogen selective membrane 140 receives the product gas 138 from the reformer 128, which may be heated. In some examples, the hydrogen selection membrane 140 extracts between 0% and 90% (or more) of the hydrogen (providing the hydrogen gas 130) from the product gas 138. The extracted hydrogen gas 130, which is pure hydrogen gas ($H_2$), is provided at a dedicated conduit and can be collected for storage, use, or removal. The remaining gas from the hydrogen selected membrane is a carbon dioxide/water mixture 134. The hydrogen selective membrane 140 can use various metallic membranes, such as but not limited to, palladium (Pd), vanadium (V), niobium (Nb) and tantalum (Ta), or alloys thereof. Other hydrogen separation technologies, such as pressure swing adsorption and cryogenic distillation, may be used and are considered to be within the scope of the presently disclosed subject matter.

In some examples, water (in the form of water vapor) may be present in the product gas 138 and the carbon dioxide/water mixture 134. If an amount of water enters the methanol tank 114, the water may be taken up and absorbed by the methanol 112, which may degrade the methanol 112. Therefore, in some examples, the system 100 may further include a cooler/condenser 141. The cooler/condenser 141 is designed to cool the carbon dioxide/water 134 to allow the water vapor to be cooled and separated out as water 143 and a carbon dioxide concentrated gas mixture 135 that is cooled prior to entering the methanol tank 114.

The carbon dioxide concentrated gas mixture 135 resulting after the separation of the hydrogen gas 130 and water 143 from the product gas 138 is provided through a control valve 142 to the methanol tank 114. The control valve 142 is an electrically actuated valve that receives a control signal 144 from a blanket controller 146. The blanket controller 146 is configured to control the amount of the carbon dioxide concentrated gas mixture 135 entering the methanol tank 114 to provide an inert blanket 148 in the vapor region 122 of the methanol tank 114. In some examples, the blanket controller 146 is a component, software, hardware, module, or other entity that receives one or more inputs, such as a pressure explained in more detail below, and provides one or more outputs to control the amount of the carbon dioxide concentrated gas mixture 135 entering the methanol tank 114. As noted above, some portion of the methanol 112 may evaporate and collect in the vapor region 122. If conditions in the vapor region 122 are stoichiometrically correct to support combustion, the presence of methanol 112 in the vapor region can present a safety hazard. Further, if a heat source contacts the methanol 112 in either the vapor region 122 or the liquid region 120, the heat source (such as a spark, fire, and the like) may cause the methanol 112 to combust.

In an attempt to reduce the probability of an uncontrolled or unintended combustion of a portion of the methanol 112 in the tank 114, the blanket controller 146 ports the carbon dioxide concentrated gas mixture 135 produced in the reformer 128 as a result of the production of the hydrogen gas 130 to the vapor region 122 of the methanol tank 114.

The introduction of the carbon dioxide concentrated gas mixture 135 into the vapor region 122 creates an inert blanket 148 in the vapor region 122. The inert blanket 148 is formed from the carbon dioxide concentrated gas mixture 135 and is used to extinguish and/or prevent conditions occurring in the tank 114 that can support combustion, such as the displacement of oxygen (air), methanol 112 gas in the vapor region 122, and other potential fuels for combustion. It should be noted that the inert blanket 148 may also include other gases such as nitrogen and water vapor depending on the operating conditions within the reformer 128. Water vapor may be removed or reduced in concentration from the carbon dioxide concentrated gas mixture 135 using various technologies such as temperature swing separation. The presently disclosed subject matter is not limited to any particular water separation technology.

The blanket controller 146 uses the control signal 144 to control the operation of the control valve 142. The control signal 144 can be an electrical or data signal that, when received by the control valve 142, causes an operation of the control valve 142 in accordance with the control signal 144. In some examples, rather than directing (or porting) the carbon dioxide concentrated gas mixture 135 to the vapor region 122, the blanket controller 146 can use control signal 144 to reduce or eliminate the flow of the carbon dioxide concentrated gas mixture 135 to the vapor region 122 and start or increase the amount of the carbon dioxide concentrated gas mixture 135 entering an overflow system 150 by opening or closing the control valve 142. In some examples, the control valve 142 may also be a pressure relief valve that, above a pressure in the methanol tank 114, the control valve 142 relieves the gases in the methanol tank 114 to the overflow system 150. In some examples, the amount of the hydrogen gas 130 produced may exceed the amount of the carbon dioxide concentrated gas mixture 135 needed to create or maintain the inert blanket 148. Rather than exhausting excess carbon dioxide 152 into the atmosphere, the blanket controller 146 can modify the position of the control valve 142 to direct an excess of carbon dioxide 152 to the overflow system 150. The overflow system 150 receives and stores the excess carbon dioxide 152 for future use or disposal. For example, the overflow system 150 can be used to compress the excess carbon dioxide 152 as a liquid or gas and stored in tanks, illustrated in FIG. 2 below. In other examples, the overflow system 150 can be used for other systems such as an inert blanket for other tanks or within hulls in a dual hull design of a ship, also illustrated in FIG. 2 below. The presently disclosed subject matter is not limited to any type of overflow system 150. In some examples, while the reformer 128 is starting up and/or shutting down, the blanket controller 146 may use control signal 144 to position the control valve 142 to allow the carbon dioxide concentrated gas mixture 135 to be diverted to an exhaust 153, allowing the system 100 to reach operational efficiency prior to diverting the carbon dioxide concentrated gas mixture 135 into the methanol tank 114 or the overflow system 150. The system 100 may further include hydrogen sensor 157. The hydrogen sensor 157 senses the concentration of hydrogen in the carbon dioxide/water 134. The hydrogen sensor 157 sends hydrogen sensor signal 159 to the blanket controller 146. The blanket controller 146 receives the hydrogen sensor signal 159 and determines if the hydrogen concentration is above a setpoint, meaning that the carbon dioxide/water 134 has a hydrogen concentration at a sufficient level that it may not be safe to introduce the carbon dioxide concentrated gas mixture 135 into the methanol tank 114 and/or the overflow system 150. Thus, in this example, if the hydrogen concentration is above a setpoint, the blanket controller 146 uses the control signal 144 to position the control valve 142 to allow the carbon dioxide concentrated gas mixture 135 to be diverted to an exhaust 153.

During the operation of the system 100, it may be desirable to monitor a pressure in the vapor region 122 of the tank 114. Pressure can be an indicator of the presence, or lack thereof, of the inert blanket 148 in the vapor region. If an excess of the carbon dioxide concentrated gas mixture 135 is being provided to the vapor region 122, the pressure in the vapor region 122 may increase to a point above operational parameters of the tank 114. To detect a pressure, a pressure sensor 154 is used to detect and provide a pressure reading 156 of a pressure in the vapor region 122 of the tank 114. The pressure reading 156 is transmitted to the blanket controller 146. If the pressure reading 156 is above a high setpoint, the blanket controller 146 can transmit the control signal 144 to change the position of the control valve 142 to provide more of the carbon dioxide concentrated gas mixture 135 to the overflow system 150 and less of the carbon dioxide concentrated gas mixture 135 to the vapor region 122 of the tank. If the pressure reading 156 is below a low setpoint, the blanket controller 146 can transmit the control signal 144 to change the position of the control valve 142 to provide less of the carbon dioxide concentrated gas mixture 135 to the overflow system 150 and more of the carbon dioxide concentrated gas mixture 135 to the vapor region 122 of the tank.

In some examples, a hydrogen production pump 158 can also be used to control the amount of the carbon dioxide concentrated gas mixture 135 being produced. If the pressure reading 156 is above a high setpoint, the blanket controller 146 can transmit a pump control signal 160. If the pressure reading 156 is below a low setpoint, the blanket controller 146 can transmit the pump control signal 160 to increase the speed of, or start, the hydrogen production pump 158, thus increasing the amount of the hydrogen gas 130, and subsequently the carbon dioxide concentrated gas mixture 135, being produced by the reformer 128. In some examples, when shutting down the engine 104, there may be a requirement to backwash or backflow carbon dioxide through the engine 104 to remove the methanol 112 still present in the engine 104 and associated pipes. Thus, the system 100 further includes a backwash valve 162. The backwash valve 162, when open, ports the carbon dioxide concentrated gas mixture 135 sent to the overflow system 150 to an outlet 164 of the engine 104. The carbon dioxide concentrated gas mixture 135 from the overflow system 150 pushes remaining methanol 112 back into the tank 114 after a shutdown of the engine 104. Once the backwash (or backflow) process is complete, the backwash valve 162 is closed.

In further examples, the reformer 128 may not be operating, whereby the carbon dioxide concentrated gas mixture 135 used to produce the inert blanket 148 is not being produced by the reformer 128. In these examples, a carbon dioxide auxiliary source 168 is used. The auxiliary source 168 or the overflow system 150 provides a secondary source of carbon dioxide when the reformer 128 is not operating but there is a need or requirement for the inert blanket 148 to be maintained. The auxiliary source 168 can include, but is not limited to, carbon dioxide in a tank, such as compressed carbon dioxide. In some examples, the auxiliary source 168 can be fed carbon dioxide using the overflow system 150. In some examples, the auxiliary source 168 and the overflow system 150 are the same system or are different systems.

As mentioned above, the system 100 is described as being used on a ship. The carbon dioxide concentrated gas mixture 135 output of the reformer 128 when producing the hydrogen gas 130 is used to provide the inert blanket 148 in the vapor region 122 of the tank 114. However, the carbon dioxide concentrated gas mixture 135 can be used for other systems and uses onboard a ship, as illustrated by way of example in FIG. 2.

Figure 2:
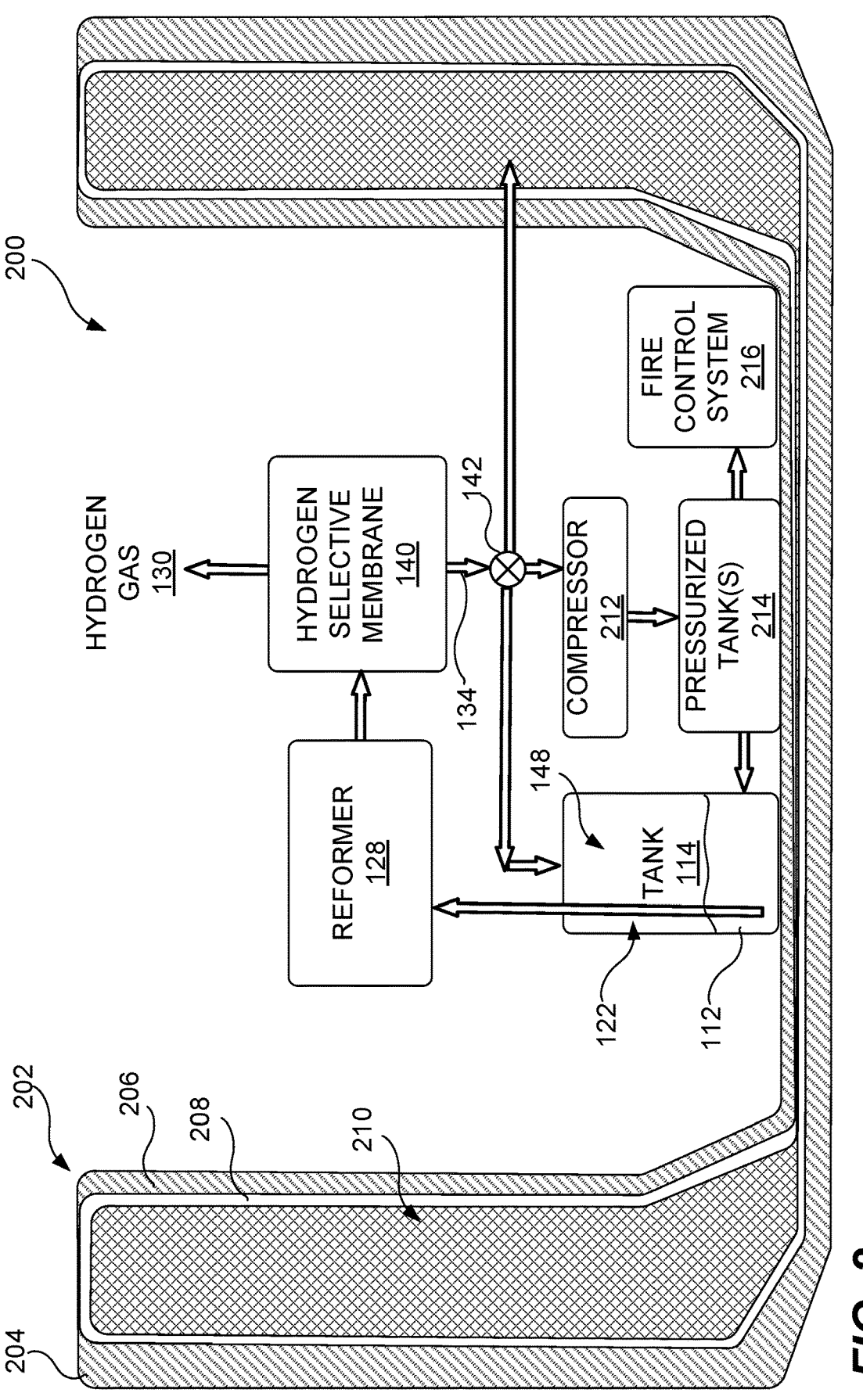
FIG. 2 is a cross-sectional view of a ship that uses inert blankets for various uses, in accordance with one or more examples of the present disclosure.

FIG. 2 is a cross-sectional view of a ship 200 that uses inert blankets for various uses, in accordance with one or more examples of the present disclosure. The ship 200 includes a hull 202. The example hull 202 illustrated in FIG. 2 is a double-hull design having a first hull 204 as an outer hull and a second hull 206 as an interior hull. The hull 202 defines an interior space 208 extending from an inner surface of the first hull 204 to an opposing inner surface of the second hull 206. The interior space 208 is generally empty but may include various systems and components (not shown). In some examples, it may be beneficial to provide an inert blanket 210, through the control valve 142, of carbon dioxide to reduce a probability of flammable gases collecting and potentially exploding in the interior space 208. It should be noted that the inert blanket 210 is illustrated as partially filling the interior space 208. In some examples, the inert blanket 210, because it is formed from a gas, will expand to fill the entirety of the interior space 208. In other examples, when using carbon dioxide, the inert blanket 210 may fill up less than the entirety of the interior space 208 if air is present, as the carbon dioxide is heavier than air.

To provide carbon dioxide for the inert blanket 210, the ship 200 includes the reformer 128 of FIG. 1. It should be noted that FIG. 2 does not illustrate all of the components illustrated in FIG. 1 for the purposes of simplicity of explanation and illustration. As explained in FIG. 1, the reformer 128 uses the methanol 112 in the tank 114 to produce the hydrogen gas 130. The carbon dioxide concentrated gas mixture 135 is ported through control valve 142 to the vapor region 122 of the tank 114 to provide the inert blanket 148. In FIG. 2, at least a portion of the carbon dioxide concentrated gas mixture 135 can be fed through the control valve 142 to a compressor 212. The compressor 212 can compress the carbon dioxide concentrated gas mixture 135 for storage in pressurized tank(s) 214. The carbon dioxide concentrated gas mixture 135 stored in the pressurized tank(s) 214 can be used for various uses such as, but not limited to, a makeup source for the inert blanket 148 if the reformer 128 is not operating or not providing enough carbon dioxide concentrated gas mixture 135 to provide the inert blanket 148. In another example, the carbon dioxide concentrated gas mixture 135 stored in the pressurized tank(s) 214 can be used in a system such as a fire control system 216. The fire control system 216 can use the carbon dioxide concentrated gas mixture 135 to suppress fires on the ship 200.

As described in FIGS. 1 and 2, the blanket controller 146 provides control signals to manipulate valves and pumps to create or maintain the inert blanket 148 in the tank 114. The blanket controller 146 receives various inputs and provides various outputs, described by way of example in FIG. 3, below.

Figure 3:
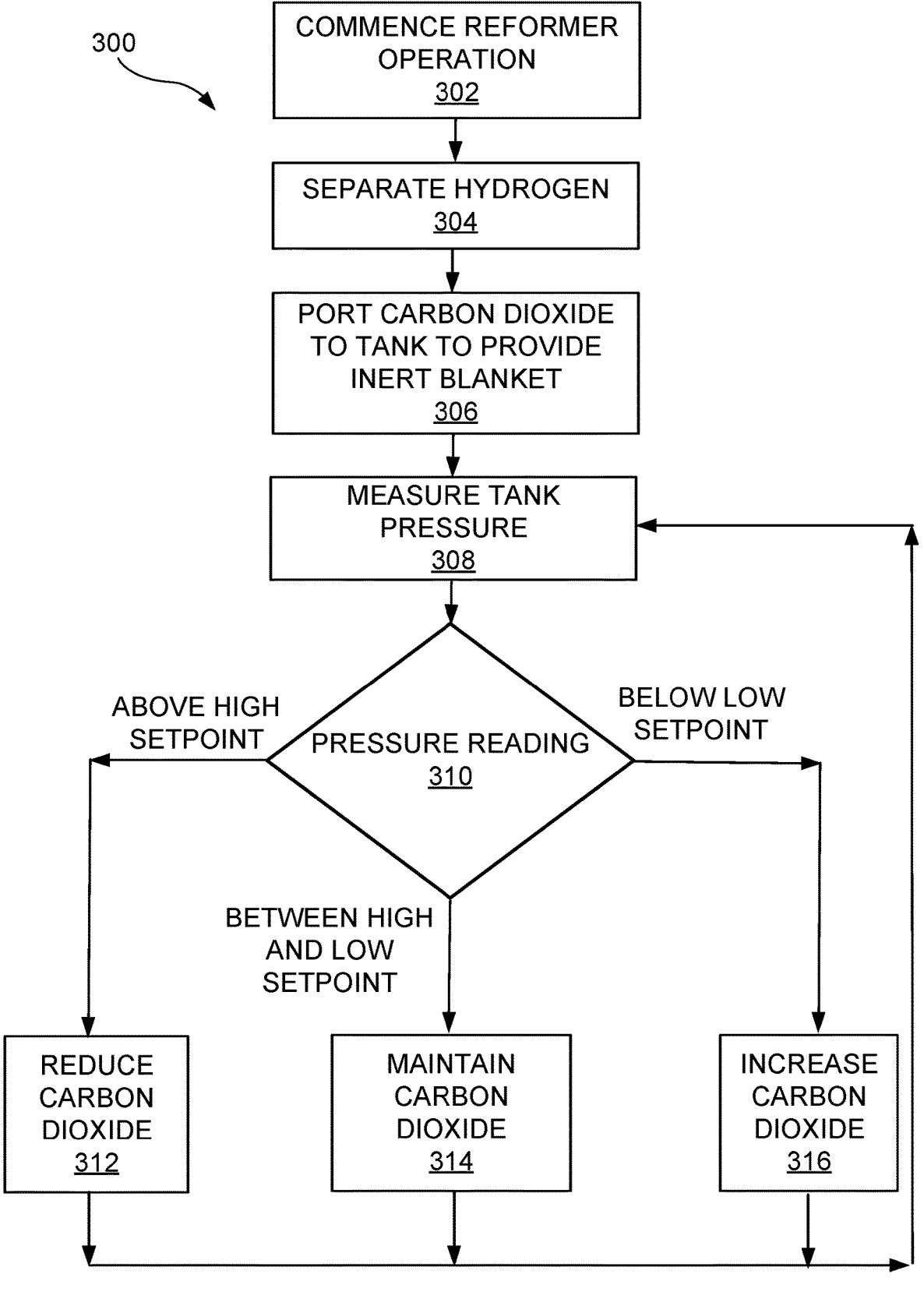
FIG. 3 is a flowchart illustrating a method to provide an inert blanket, in accordance with examples of the presently disclosed subject matter.

FIG. 3 is a flowchart illustrating a method 300 to provide an inert blanket 148, in accordance with examples of the presently disclosed subject matter. The method 300 may include different and/or additional steps, or steps may be performed in a different order than described herein. Further, the method 300 can be performed in whole or in part by one or more system controllers or processors, such as the blanket controller 146 of FIG. 1. For ease of description, the various steps of method 300 are described below as being performed by the blanket controller 146 unless otherwise specified.

At step 302, the blanket controller 146 causes the reformer 128 to commence operation. The reformer 128 can be various types of reformers. The presently disclosed subject matter is not limited to any particular type of reformer. The reformer 128 of FIG. 1 is a methanol 112 reformer. In accordance with Reaction 1, at step 302 the reformer 128 produces carbon dioxide and hydrogen gas, though it should be understood that depending on the operation of the reformer 128 and the input fluids, other gases such as nitrogen may be present.

At step 304, the hydrogen selective membrane 140 separates hydrogen gas 130 from the carbon dioxide concentrated gas mixture 135 produced by the reformer 128. The hydrogen selective membrane 140 can use various metallic membranes, such as but not limited to, palladium (Pd), vanadium (V), niobium (Nb) and tantalum (Ta), or alloys thereof. Other hydrogen separation technologies, such as pressure swing adsorption and cryogenic distillation, may be used and are considered to be within the scope of the presently disclosed subject matter.

At step 306, the blanket controller 146 causes the carbon dioxide concentrated gas mixture 135 to be ported through the control valve 142 to the tank 114 to create the inert blanket 148 in the vapor region 122 of the methanol tank 114 through control signal 144. The inert blanket 148 is formed from the carbon dioxide concentrated gas mixture 135 and is used to extinguish and/or prevent conditions occurring in the tank 114 that can support combustion, such as the displacement of oxygen (air), methanol 112 gas in the vapor region 122 and other potential fuels for combustion. It should be noted that the inert blanket 148 may also include other gases such as nitrogen and water vapor depending on the operating conditions within the reformer 128.

At step 308, the pressure sensor 154 measures a pressure in the tank 114 and provides the pressure reading 156 to the blanket controller 146. The pressure reading 156 is an indication of the presence and concentration of the carbon dioxide concentrated gas mixture 135 forming the inert blanket 148. If the pressure is too high, the carbon dioxide concentrated gas mixture 135 being ported to the tank 114 may be pressurizing the tank above an acceptable operating range. If the pressure is too low, there may not be enough carbon dioxide concentrated gas mixture 135 to form the inert blanket 148.

At step 310, the blanket controller 146 receives the pressure reading 156. As noted above, the blanket controller 146 is configured to provide and maintain the inert blanket 148 and uses a pressure reading from the tank 114 to maintain the inert blanket 148. At step 310, upon determining that the pressure reading 156 is above a high setpoint (Step 310-Yes), the blanket controller at step 312 will reduce the amount of the carbon dioxide concentrated gas mixture 135 being ported to the tank 114. The blanket controller 146 operates the control valve 142 to direct the carbon dioxide concentrated gas mixture 135 to the overflow system 150. In another example, the blanket controller 146 can reduce the speed or stop the hydrogen production pump 158, thus reducing the amount of the hydrogen gas 130, and subsequently the carbon dioxide concentrated gas mixture 135, being produced by the reformer 128.

At step 310, upon determining that the pressure reading 156 is at or below a high setpoint and at or above a low setpoint, the blanket controller 146 maintains the carbon dioxide concentrated gas mixture 135 production at step 314. At step 310, upon detecting that the pressure reading 156 is below a low setpoint, the blanket controller at step 316 will increase the amount of the carbon dioxide concentrated gas mixture 135 being ported to the tank 114. The blanket controller 146 operates the control valve 142 to direct less of the carbon dioxide concentrated gas mixture 135 to the overflow system 150 and more of the carbon dioxide concentrated gas mixture 135 to the tank 114. In another example, the blanket controller 146 can increase the speed of, or start, the hydrogen production pump 158, thus increasing the amount of the hydrogen gas 130, and subsequently the carbon dioxide concentrated gas mixture 135, being produced by the reformer 128. The method 300 continues to step 308 where the tank pressure is measured.

Figure 4:
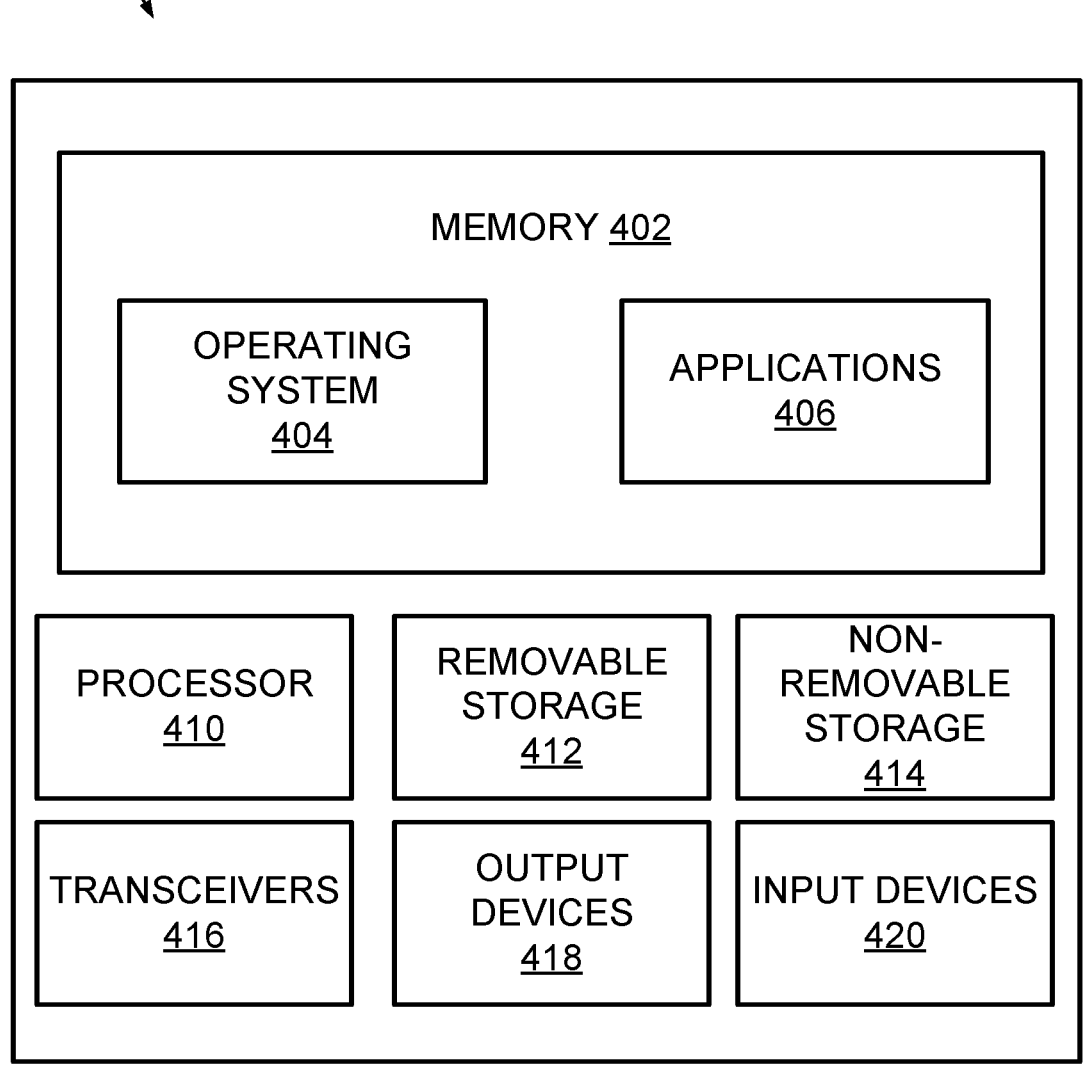
FIG. 4 depicts a component level view of a blanket controller for use with the systems and methods described herein, in accordance with examples of the presently disclosed subject matter.

FIG. 4 depicts a component level view of the blanket controller 146 for use with the systems and methods described herein, in accordance with examples of the presently disclosed subject matter. The blanket controller 146 can comprise several components to execute the above-mentioned functions and provide various control signals, such as the control signal 144 and the pump control signal 160. As discussed below, the blanket controller 146 can comprise memory 402 including an operating system (OS) 404 and one or more standard applications 406. The standard applications 406 can also include valve signal generators to control various valves, including the control valve 142, among others.

The blanket controller 146 can also comprise one or more processors 410 having one or more cores and one or more of removable storage 412, non-removable storage 414, transceiver(s) 416, output device(s) 418, and input device(s) 420. In various implementations, the memory 402 can be volatile (such as random access memory (RAM)), non-volatile (such as read only memory (ROM), flash memory, etc.), or some combination of the two. The OS 404 contains the modules and software that support basic functions of the blanket controller 146, including the generation of signals to open and close valves and operate pumps.

In some implementations, the processor(s) 410 can be one or more central processing units (CPUs), graphics processing units (GPUs), both CPU and GPU, or any other processing unit. The blanket controller 146 may also include additional data storage devices (removable and/or non-removable) such as, for example, magnetic disks, optical disks, or tape. Such additional storage is illustrated in FIG. 4 by removable storage 412 and non-removable storage 414.

Non-transitory computer-readable media may include volatile and nonvolatile, removable and non-removable tangible, physical media implemented in technology for storage of information, such as computer readable instructions, data structures, program modules, or other data. The memory 402, removable storage 412, and non-removable storage 414 are all examples of non-transitory computer-readable media. Non-transitory computer-readable media include, but are not limited to, RAM, ROM, electronically erasable programmable ROM (EEPROM), flash memory or other memory technology, compact disc ROM (CD-ROM), digital versatile discs (DVD) or other optical storage, magnetic cassettes, magnetic tape, magnetic disk storage or other magnetic storage devices, or any other tangible, physical medium which can be used to store the desired information and which can be accessed by the blanket controller 146. Any such non-transitory computer-readable media may be part of the blanket controller 146 or may be a separate database, databank, remote server, or cloud-based server. In some implementations, the transceiver(s) 416 include any transceivers known in the art. In some examples, the transceiver(s) 416 are used to transmit signals to open or close valves, start or stop pumps, or receive pressure readings in various examples disclosed herein.

The transceiver(s) 416 may also include one or more radio transceivers that perform the function of transmitting and receiving radio frequency communications via an antenna (e.g., Wi-Fi or Bluetooth®).

In some implementations, the output device(s) 418 include any output devices known in the art, such as a display (e.g., a liquid crystal or thin-film transistor (TFT) display), a touchscreen, speakers, a vibrating mechanism, or a tactile feedback mechanism. Thus, the output device(s) can include a screen or display. In various implementations, input device(s) 420 include any input devices known in the art. For example, the input device(s) 420 may include a camera, a microphone, or a keyboard/keypad.

INDUSTRIAL APPLICABILITY

The present disclosure describes systems and processes for inert blanketing using carbon dioxide concentrated gas mixture 135 produced by a reformer 128 (or other carbon dioxide producing machine). Various examples of the presently disclosed subject matter utilize a waste product, the carbon dioxide, produced in a hydrogen production process to reduce the flammability of the space (or atmosphere). The carbon dioxide can displace oxygen above the liquid line of the methanol if used to as an inert blanket in a fuel tank. The carbon dioxide can also be used to disperse oxygen in a void area such as in a space between two hulls of a double hulled ship. Further, the sequestration of carbon dioxide as inert blankets can reduce the carbon footprint of the vessel, as the carbon dioxide is not exhausted into the atmosphere. The use of an output of a reformer can provide various advantages over conventional systems. In some examples, an additional system or components do not need to be installed to provide an inert blanket, such as bottles for storing nitrogen or a nitrogen-generating system. In another example, waste carbon dioxide formed by the generation of the hydrogen can essential be sequestered as the inert blanket in the tanks, potentially reducing a carbon footprint of a marine vessel.

Unless explicitly excluded, the use of the singular to describe a component, structure, or operation does not exclude the use of plural such components, structures, or operations or their equivalents. As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

While aspects of the present disclosure have been particularly shown and described with reference to the embodiments above, it will be understood by those skilled in the art that various additional embodiments may be contemplated by the modification of the disclosed machines, systems, and methods without departing from the spirit and scope of what is disclosed. Such embodiments should be understood to fall within the scope of the present disclosure as determined based upon the claims and any equivalents thereof.

What is claimed is:

1. A system, comprising:

an internal combustion engine mechanically connected to a generator through a shaft, wherein the internal combustion engine rotates the shaft to rotate windings of the generator to generate an electrical power output;

a methanol tank for providing methanol to the engine and a reformer, wherein the reformer produces hydrogen gas and carbon dioxide from a reaction of the methanol and water vapor;

a hydrogen selective membrane to separate the hydrogen gas from the carbon dioxide to produce a carbon dioxide/water mixture;

a condenser/cooler to cool the carbon dioxide/water mixture to condense the water and cool the carbon dioxide, thereby separating the water from the carbon dioxide/water mixture to form a carbon dioxide concentrated gas mixture; and a blanket controller configured to:
  manipulate a control valve to direct the carbon dioxide concentrated gas mixture produced by the reformer into a vapor region of a tank to produce an inert blanket in the vapor region of the tank to reduce a flammability of gases in the vapor region; and
  manipulate the control valve to direct the carbon dioxide concentrated gas mixture produced by the reformer to an overflow system.

2. The system of claim 1, further comprising a pressure sensor operably connected to the blanket controller, the pressure sensor being configured to determine a pressure of the vapor region and to provide a signal indicating the pressure to the blanket controller.

3. The system of claim 2, wherein the blanket controller is further configured to:
  determine if the pressure is:
    above a high setpoint,
    at or below the high setpoint and at or above a low setpoint; or
    below the low setpoint.

4. The system of claim 3, wherein the blanket controller is further configured to reduce a production of the carbon dioxide concentrated gas mixture if the pressure is above the high setpoint by:
  increasing a first amount of the carbon dioxide concentrated gas mixture produced by the reformer ported to an overflow system and reducing a second amount of the carbon dioxide concentrated gas mixture produced by the reformer ported to the tank; or
  reducing a speed of or stopping a hydrogen production pump.

5. The system of claim 3, wherein the blanket controller is further configured to maintain a production of carbon dioxide concentrated gas mixture if the pressure is at or below the high setpoint and at or above the low setpoint.

6. The system of claim 3, wherein the blanket controller is further configured to increase a production of the carbon dioxide concentrated gas mixture if the pressure is below the low setpoint by:
  decreasing a first amount of the carbon dioxide concentrated gas mixture produced by the reformer ported to an overflow system and increasing a second amount of the carbon dioxide concentrated gas mixture produced by the reformer ported to the tank; or
  increasing a speed of or starting a hydrogen production pump.

7. The system of claim 1, further comprising a hydrogen sensor operably connected to the blanket controller, the hydrogen sensor being configured to determine a concentration of hydrogen in the carbon dioxide/water mixture and to provide a signal indicating the concentration to the blanket controller.

8. The system of claim 7, wherein the blanket controller is further configured to:

determine if the concentration is above a setpoint; and
manipulate the control valve to direct the carbon dioxide concentrated gas mixture to an exhaust if the concentration is above the setpoint.

9. A system, comprising:
an internal combustion engine mechanically connected to a generator through a shaft, wherein the internal combustion engine rotates the shaft to rotate windings of the generator to generate an electrical power output;

a methanol tank for providing methanol to the engine and a reformer, wherein the reformer produces hydrogen gas and carbon dioxide from a reaction of the methanol and water vapor;

a hydrogen selective membrane to separate the hydrogen gas from the carbon dioxide to produce a carbon dioxide/water mixture;

a condenser/cooler to cool the carbon dioxide/water mixture to condense the water and cool the carbon dioxide, thereby separating the water from the carbon dioxide/water mixture to form a carbon dioxide concentrated gas mixture; and a blanket controller configured to:
  manipulate a control valve to direct the carbon dioxide concentrated gas mixture produced by the reformer into a vapor region of a tank to produce an inert blanket in the vapor region of the tank to reduce a flammability of gases in the vapor region;
  receive a signal from a pressure sensor that indicates a pressure of the vapor region;
  determine if the pressure is:
    above a high set point,
    at or below the high setpoint and at or above a low set point; or
    below the low setpoint; and
  reduce a production of the carbon dioxide concentrated gas mixture if the pressure is above the high setpoint by:
    increasing a first amount of the carbon dioxide concentrated gas mixture produced by the reformer ported to an overflow system and reducing a second amount of the carbon dioxide concentrated gas mixture produced by the reformer ported to the tank; or
    reducing a speed of or stopping a hydrogen production pump.

10. The system of claim 9, wherein the blanket controller is further configured to manipulate the control valve to send a portion of the carbon dioxide concentrated gas mixture produced by the reformer to an overflow system.

11. The system of claim 9, wherein the blanket controller is further configured to maintain a production of the carbon dioxide concentrated gas mixture if the pressure is at or below the high setpoint and at or above the low setpoint.

12. The system of claim 9, wherein the blanket controller is further configured to increase a production of the carbon dioxide concentrated gas mixture if the pressure is below the low setpoint by:
  decreasing a first amount of the carbon dioxide concentrated gas mixture produced by the reformer ported to an overflow system and increasing a second amount of the carbon dioxide concentrated gas mixture produced by the reformer ported to the tank; or
  increasing a speed of or starting a hydrogen production pump.

13. The system of claim 9, further comprising a hydrogen sensor operably connected to the blanket controller, the hydrogen sensor being configured to determine a concentration of hydrogen in the carbon dioxide/water mixture and to provide a signal indicating the concentration to the blanket controller.

14. The system of claim 13, wherein the blanket controller is further configured to:
   determine if the concentration is above a setpoint; and
   manipulate the control valve to direct the carbon dioxide concentrated gas mixture to an exhaust if the concentration is above the setpoint.

15. A system, comprising:
   an internal combustion engine mechanically connected to a generator through a shaft, wherein the internal combustion engine rotates the shaft to rotate windings of the generator to generate an electrical power output;
   a methanol tank for providing methanol to the engine and a reformer, wherein the reformer produces hydrogen gas and carbon dioxide from a reaction of the methanol and water vapor;
   a hydrogen selective membrane to separate the hydrogen gas from the carbon dioxide to produce a carbon dioxide/water mixture;
   a condenser/cooler to cool the carbon dioxide/water mixture to condense the water and cool the carbon dioxide, thereby separating the water from the carbon dioxide/water mixture to form a carbon dioxide concentrated gas mixture; and
   a blanket controller configured to:
      manipulate a control valve to direct the carbon dioxide concentrated gas mixture produced by the reformer into a vapor region of a tank to produce an inert blanket in the vapor region of the tank to reduce a flammability of gases in the vapor region;
      receive a signal from a pressure sensor that indicates a pressure of the vapor region;
      determine if the pressure is:
         above a high set point,
         at or below the high setpoint and at or above a low set point; or
         below the low setpoint; and
      maintain a production of carbon dioxide concentrated gas mixture if the pressure is at or below the high setpoint or above the low setpoint.

16. The system of claim 15, wherein the blanket controller is further configured to manipulate the control valve to send a portion of the carbon dioxide concentrated gas mixture produced by the reformer to an overflow system.

17. The system of claim 15, further comprising a hydrogen sensor operably connected to the blanket controller, the hydrogen sensor being configured to determine a concentration of hydrogen in the carbon dioxide/water mixture and to provide a signal indicating the concentration to the blanket controller.

18. The system of claim 17, wherein the blanket controller is further configured to:
   determine if the concentration is above a setpoint; and
   manipulate the control valve to direct the carbon dioxide concentrated gas mixture to an exhaust if the concentration is above the setpoint.

19. A system, comprising:
   an internal combustion engine mechanically connected to a generator through a shaft, wherein the internal combustion engine rotates the shaft to rotate windings of the generator to generate an electrical power output;
   a methanol tank for providing methanol to the engine and a reformer, wherein the reformer produces hydrogen gas and carbon dioxide from a reaction of the methanol and water vapor;
   a hydrogen selective membrane to separate the hydrogen gas from the carbon dioxide to produce a carbon dioxide/water mixture;
   a condenser/cooler to cool the carbon dioxide/water mixture to condense the water and cool the carbon dioxide, thereby separating the water from the carbon dioxide/water mixture to form a carbon dioxide concentrated gas mixture; and
   a blanket controller configured to:
      manipulate a control valve to direct the carbon dioxide concentrated gas mixture produced by the reformer into a vapor region of a tank to produce an inert blanket in the vapor region of the tank to reduce a flammability of gases in the vapor region;
      receive a signal from a pressure sensor that indicates a pressure of the vapor region;
      determine if the pressure is:
         above a high set point,
         at or below the high setpoint and at or above a low set point; or
         below the low setpoint; and
      increase a production of the carbon dioxide concentrated gas mixture if the pressure is below the low setpoint by:
         decreasing a first amount of the carbon dioxide concentrated gas mixture produced by the reformer ported to an overflow system and increasing a second amount of the carbon dioxide concentrated gas mixture produced by the reformer ported to the tank; or
         increasing a speed of or starting a hydrogen production pump.

20. The system of claim 19, wherein the blanket controller is further configured to manipulate the control valve to send a portion of the carbon dioxide concentrated gas mixture produced by the reformer to an overflow system.

* * * * *